3,424,221
APPARATUS AND METHOD FOR CONTINUOUS
CRYSTALLIZATION BY EVAPORATION
Gene W. Luce, 2710 Bristol Place,
New Orleans, La. 70114
Filed June 6, 1966, Ser. No. 560,952
U.S. Cl. 159—26                         21 Claims
Int. Cl. B01d 9/00

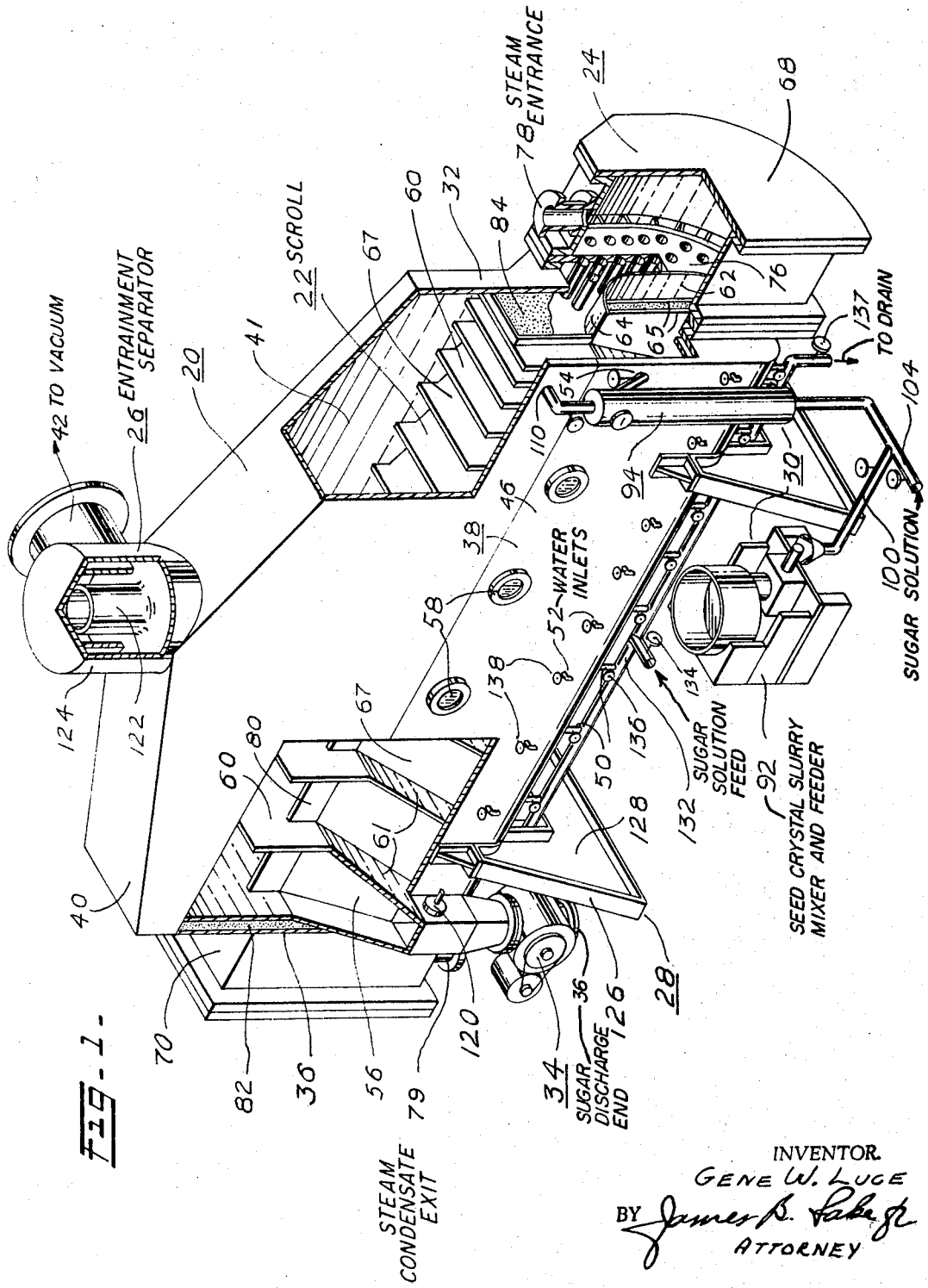

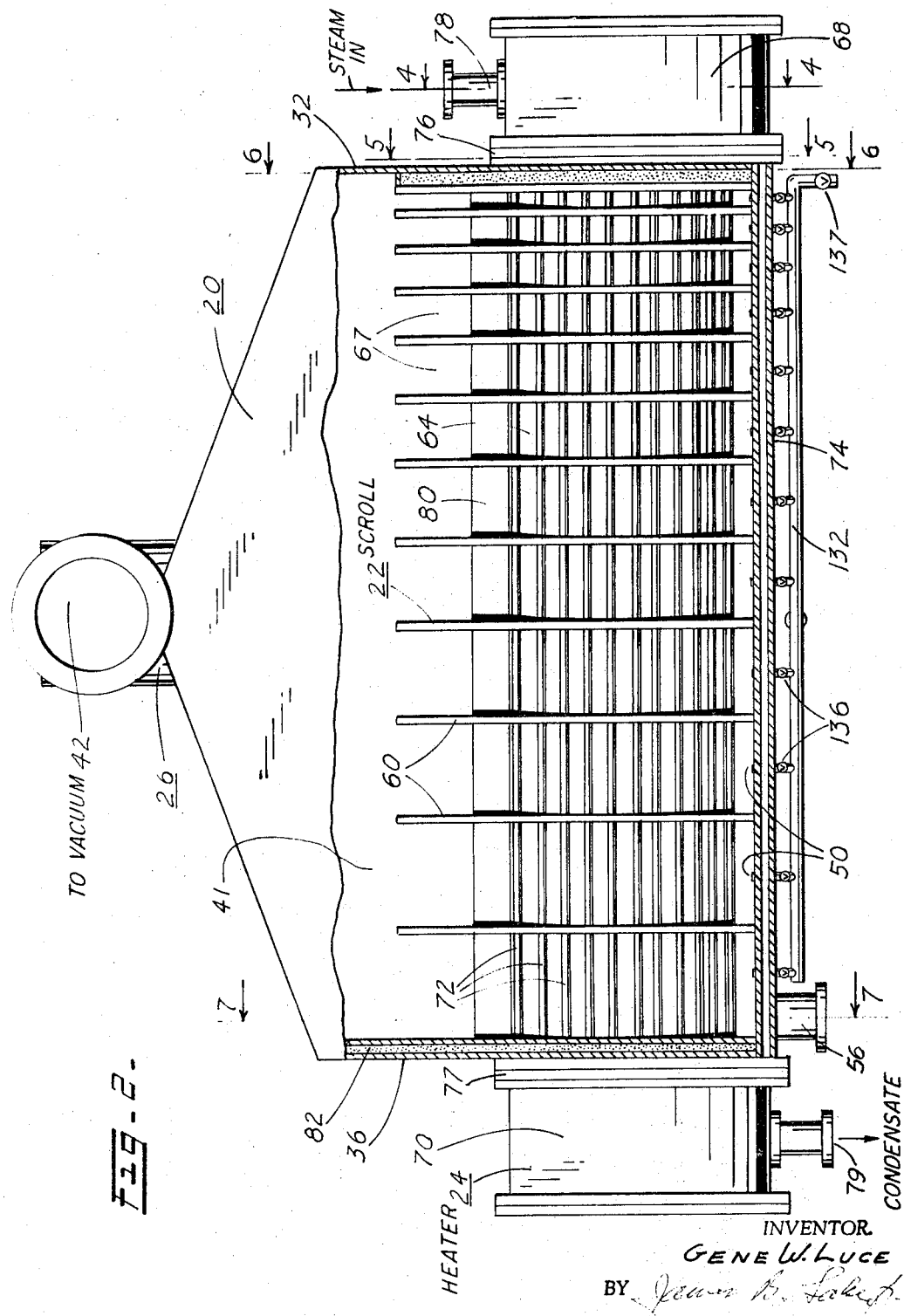

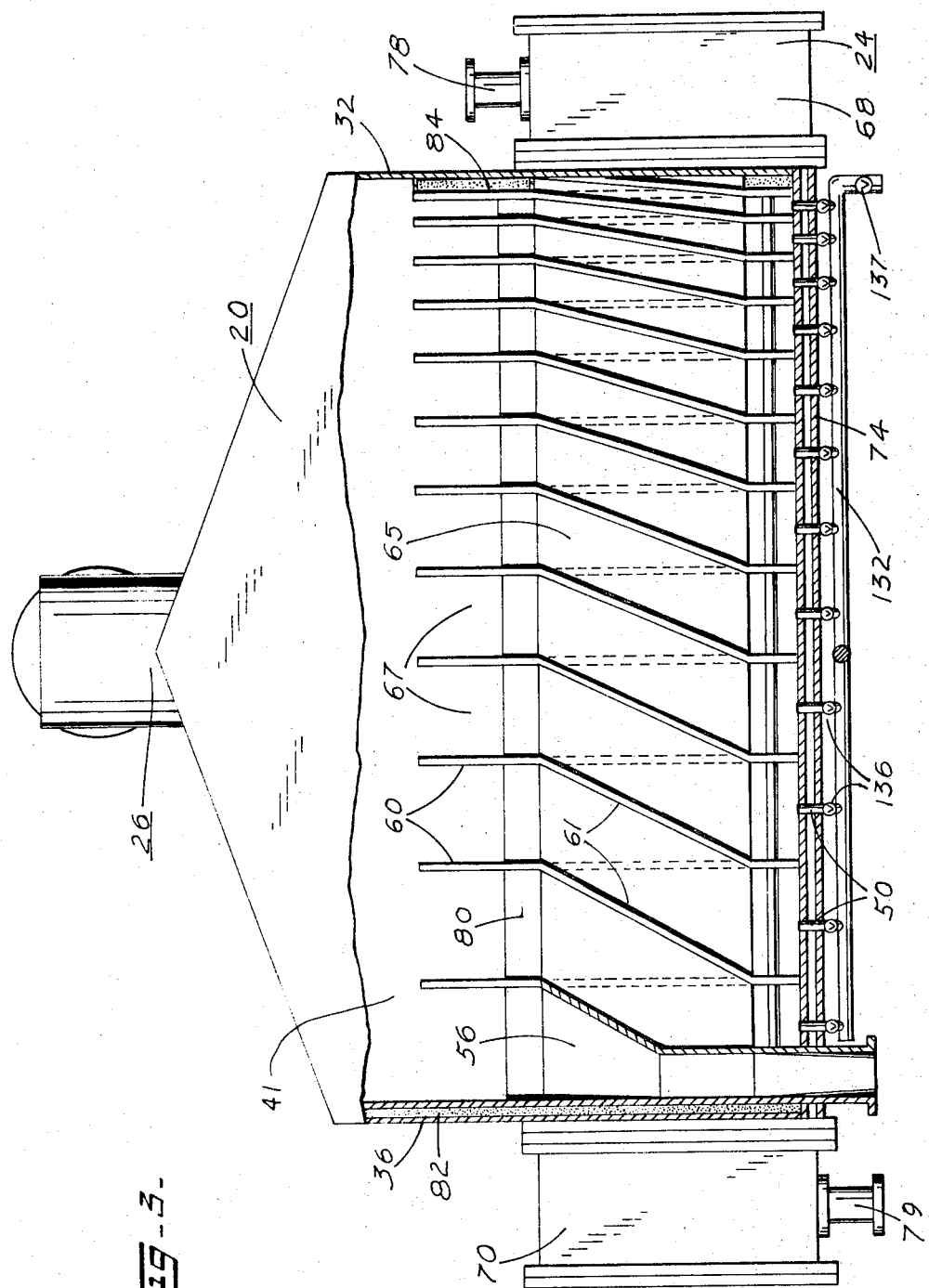

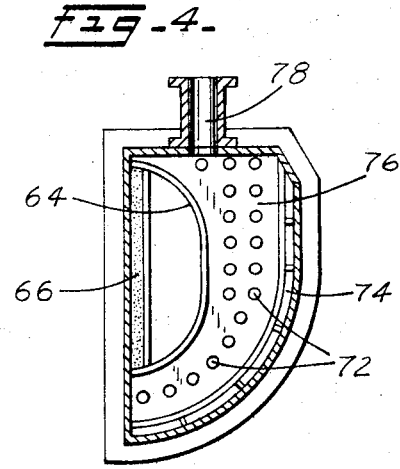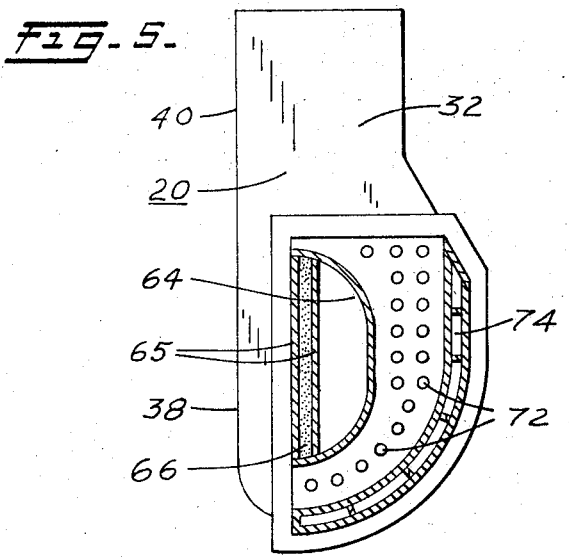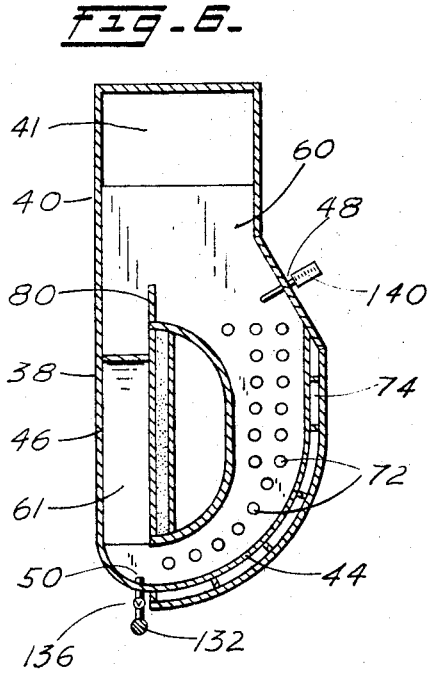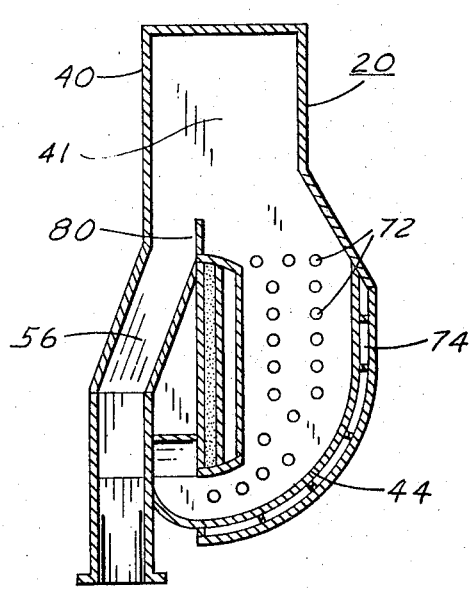

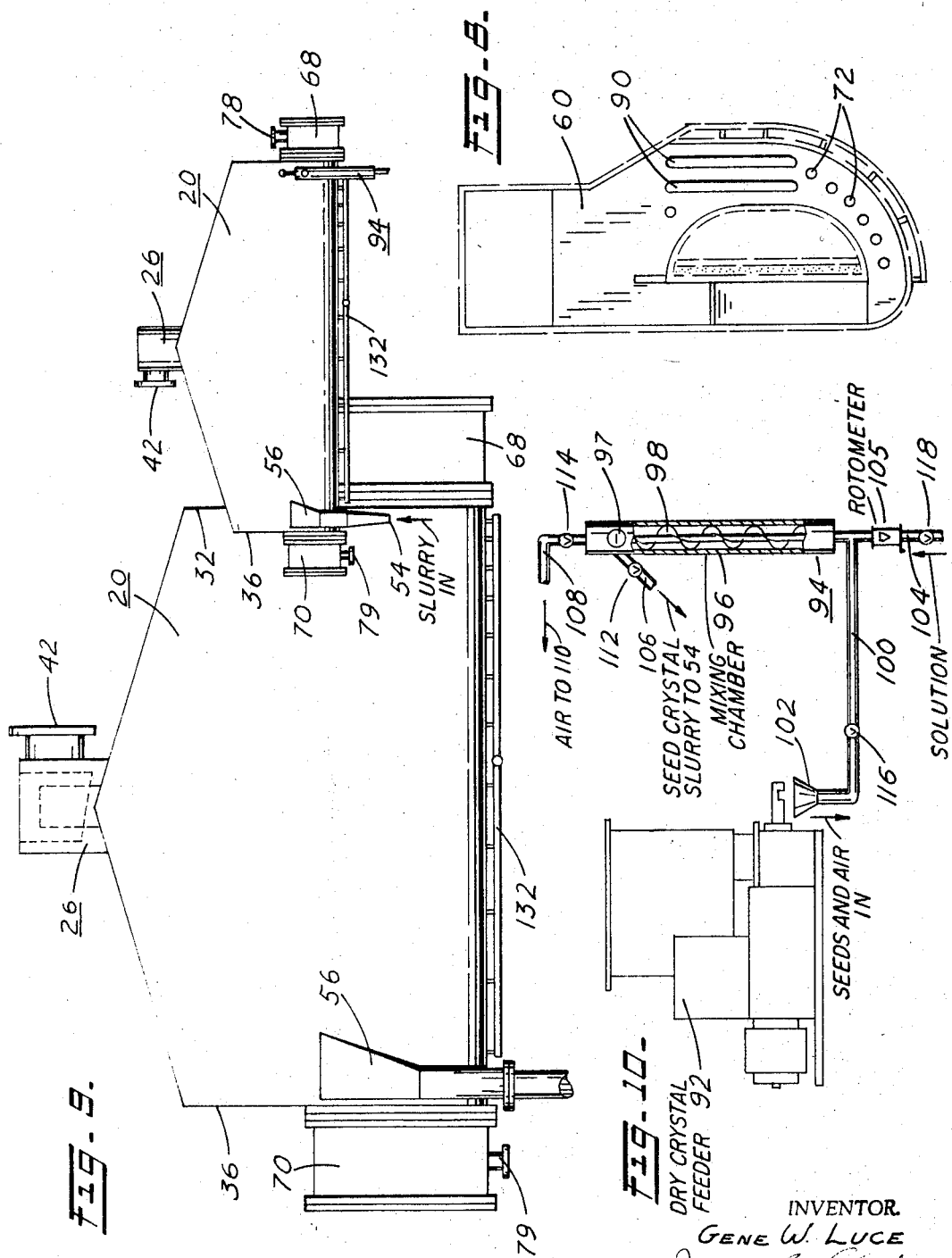

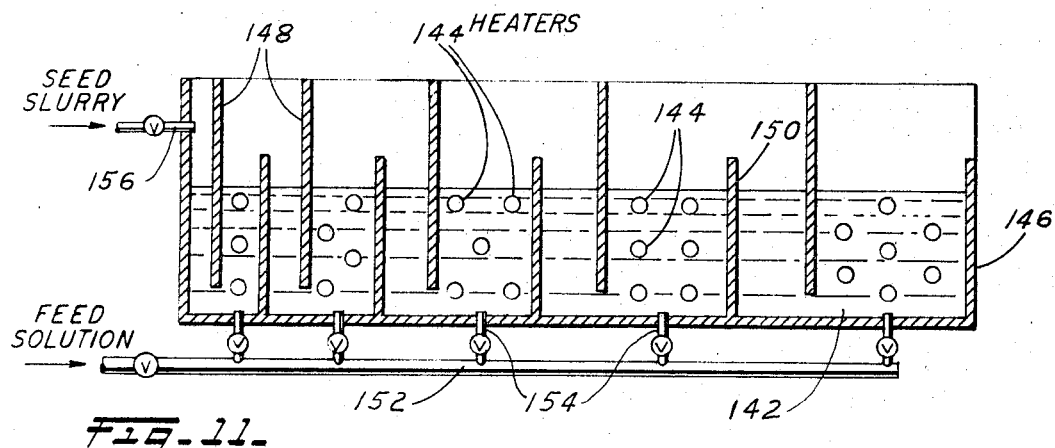
F̄ᵢ̄ḡ.-11.
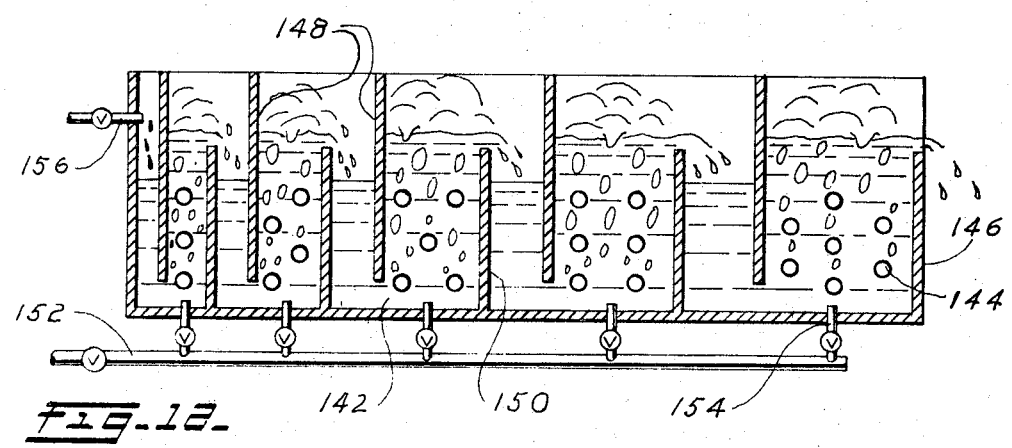
F̄ᵢ̄ḡ.-12.
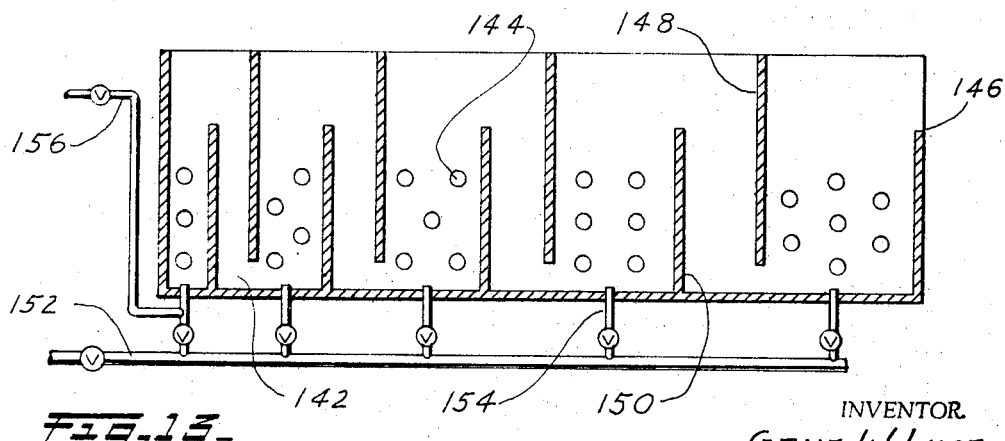
F̄ᵢ̄ḡ.-13.

ABSTRACT OF THE DISCLOSURE

A crystallizer for continuously crystallizing material by evaporation material from solution onto seed crystals that are continuously introduced at a controlled rate into the feed end of a horizontal boiler in which is mounted a stationary horizontal scroll that divides the boiler longitudinally into oppositely disposed sides, one of which is heated and the other remaining unheated, and transversely into a plurality of interconnected chambers of progressively greater volume from said feed end of the boiler, said chambers having means for continuously introducing and augmenting said material in solution, the mixture of seed crystals and solution progressing from chamber to chamber from said feed end of the boiler to the other end by thermal activity of the boiling mixture induced by the eccentric heating in the boiler, said crystals growing manyfold in size without increase in number as the increasing volume of said mixture passes through said progressively larger chambers to be discharged from said boiler from last of said chambers.

---

The invention relates in general to apparatus and method of continuously concentrating solutions by evaporation and continuously crystallizing material from said solution and more particularly for continuously developing crystals from sugar solutions from which water is simultaneously removed by evaporation.

The apparatus and method of the invention is particularly unique in that no moving parts are included in its construction as the thermal characteristics of the process are utilized for continuously moving and mixing the material in process from the input end of a horizontal trough to discharge at the opposite end of the trough following a generally helical path around a stationary scroll and in a second species of the invention a wavelike path.

The invention will be described with respect to the crystallization of sugar out of solution. A subcombination of the invention, adaptable to the continuous process practiced in selective applications, is an apparatus for continuously mixing and introducing a seed slurry into the trough.

In one step of the manufacture of sugar, a water and sucrose solution or syrup is highly concentrated by evaporation resulting in the crystallization of sucrose from said solution onto seed crystals previously formed or injected as a slurry into the solution for that purpose. When the seed crystals have grown to the desired size in the concentrated solution, the mixture is centrifuged, the crystals being retained on a screen having a finer mesh than the size of the crystals and the liquid passing through the screen for reprocessing. Every effort is made to produce a homogeneous product in size and quality of crystals and to prevent both the formation of new crystals which vary in size and may either clog the centrifugal screen or pass through it, and to prevent crystals from adhering together forming twins and conglomerates which entrain small amounts of syrup at the points of adhesion. Essentially the same theory of procedure is followed by the invention except that the invention provides for the continuous production of crystallized sugar while heretofore only discontinuous production in batches has been realized. Other disadvantages of current practice and operation and the limited results obtained thereby are made clear in the following brief description.

The process of sugar crystallization by evaporation is currently carried out in apparatus known as vacuum pans, the most popular type being the calandria pan. The process is carried out under vacuum or reduced pressure to reduce the boiling temperature and to minimize the formation of caramels and undesirable color. The calandria pan comprises a large, closed, cylindrical vessel mounted vertically, the lower portion being equipped with a calandria heating element and the upper section being connected to a source of reduced pressure. The calandria is cylindrical in shape and of the same diameter as the pan. The shell of the calandria often forms part of the shell of the pan and comprises two horizontal circular tube sheets connected together by a plurality of outer uptake tubes and one large central tube or downtake. The outer uptake tubes are three to four inches in diameter and two and a half to four feet long and the central downtake has a diameter of approximately half that of the tube sheets and conforms in length to the uptake tubes. Steam inlets are defined in the calandria, the steam passing around the tubes and the sucrose solution passing therethrough. These calandria pans may be as much as seventeen feet in diameter and contain a mass of syrup and crystallized sugar as high as thirteen feet at the end of a batch crystallization or strike as it is called in the art.

In operation an initial "graining charge" of syrup containing 60 to 70 percent sugar in solution is drawn into the pan to completely cover the calandria heating element. This charge is concentrated by evaporation until the syrup has reached the zone of supersaturation known as the "metastable" zone. In this zone the sucrose contained in solution is greater than that contained in a saturated solution but will not crystallize out unless there are sugar crystals already present to crystallize onto. Above this zone new unwanted crystals may form and below this zone the syrup first reaches saturation and then becomes unsaturated, the crystals dissolving back into solution. Once the syrup has reached the metastable zone it is seeded, the best practice being by the introduction of a seed slurry containing very fine sucrose crystals which represent the total number of crystals desired in the batch of material or strike being processed. The crystals in the slurry may be as small as one three thousandths of their size at the end of the strike and represent less than .01% of the graining charge. After seeding there is a period known as "pulling the grain together" in which water is evaporated from the sucrose solution or "mother-liquor" as it is known in the art causing sucrose to be precipitated out of solution and deposited on the surfaces of the seed crystals. This period continues until the crystals represent approximately twenty percent by volume of the solution, this mixture of mother-liquor and crystals being known in the art as "massecuite." During this period it is necessary to add syrup to maintain the level of massecuite above the calandria to prevent scorching. Once the twenty percent mixture is reached, or the grain pulled together, feeding and evaporation is continued until the strike reaches its maximum height in the pan and the crystals attain the desired size and represent approximately 55 percent of the massecuite by volume. The strike is then dropped from the pan and the process repeated.

The limitations of this apparatus and practice include the following: First, since saturation of a solution varies with temperature and temperature varies with pressure, variations in pressure in a massecuite thirteen feet deep may cause a temperature variation of over 30 degrees Fahrenheit between the surface and bottom of the solution that can carry the massecuite above and below the metastable zone and thus effect the homogeneousness of the crystals. An effort to stablize the temperature has been made through the construction of the calandria in that circulation is induced by the formation of vapor bubbles in the uptake tubes to lighten the mass therein as compared with the balancing column in the central downtake in which no bubbles are formed, thereby causing an upflow in the outer tubes and a downflow in the downtake. However, the entire mass within the pan should be turned over once a minute and this requires so great a velocity (over 70 feet per minute at certain stages) through the downtake that it is seldom realized without a mechanical stirring mechanism, and this is not entirely effective at the end of the strike when viscosity and height of the massecuite is the greatest. Even with the best stirring, the circulating paths of the massecuite through the calandria vary in length from the downtake outward, the longest path being as much as three times the length of the shortest path, thereby making the paths and developing environment of the crystals different and therefore their final size different. Second, during the period of pulling the grain together a critical condition exists as there is sufficient crystal surface area present to accept only a small portion of the sucrose that can be made available by the evaporative capabilities of the calandria, this can result in the spontaneous formation of unwanted new crystals known as "false grain" and the formation of twins and conglomerates. While near the end of the strike there is sufficient crystal surface to utilize more than five times the evaporative capabilities of the calandria with proper circulation. Third, it is difficult to obtain even distribution throughout the massecuite of the additional feed syrup supplied to make up for evaporation and provide more sucrose for continued crystallization. With the calandria pan it is the practice to feed the syrup to the pan just below the calandria and rely on the uneven circulation for distribution. The fourth, and most notable disadvantage is the discontinuous process in which a pan must be repetitiously charged and discharged with resulting fluctuations in demand on the steam plant and pressure reducing system, and in which large holding tanks must be provided to hold the charge and discharge of the crystallizing apparatus.

It is an object of the invention to provide an apparatus for continuous crystallization by evaporation having no moving parts for propelling material in process therethrough and to provide a method adapted for use therewith.

Another object of the invention is to provide means for maintaining crystal development at substantially an optimum rate in all stages of crystallization.

Another object of the invention is to provide means for maintaining a uniform crystal developing environment in all stages of crystallization.

Another object of the invention is to provide an apparatus for continuous crystallization whereby the developing crystals follow a positive flow pattern therethrough and every crystal follows substantially the same pattern.

Another object of the invention is to provide an apparatus for continuous crystallization adapted to use substantially its full evaporative capacity in all stages of crystallization.

Another object of the invention is to provide means for uniformly distributing additional solution throughout the crystallizing mass during the continuous crystallizing process.

Oher objects and a fuller understanding may be had by referring to the following description and claims, taken in conjunction with the accompanying drawings, in which:

FIGURE 1 is a partially cut-a-way three dimensional view from above the invention, FIGURE 2 is a partially cut-a-way side view of the invention, FIGURE 3 is similar to FIGURE 2 of the other side of the invention, taken in the same direction, FIGURE 4 is a sectional view along section lines 4—4 of FIGURE 2, FIGURE 5 is a sectional view along section lines 5—5 of FIGURE 2, FIGURE 6 is a sectional view along section lines 6—6 of FIGURE 2, FIGURE 7 is a sectional view along section lines 7—7 of FIGURE 2, FIGURE 8 is a sectional view similar to FIGURE 6 showing an alternate heating arrangement, FIGURE 9 is a side view of the invention in two stages, FIGURE 10 is a partially sectional view of a continuous seed slurry mixer and feeder.

FIGURE 11 is a diagrammatic side view in cross-section of a second species of the invention and shows the level of the mass under non-boiling conditions, FIGURE 12 is similar to FIGURE 11 but shows the level of the mass under boiling or operating conditions, and FIGURE 13 is a diagrammatic side view in cross-section similar to FIGURES 11 and 12 showing an alternate receiving end arrangement.

Referring to the drawings and specifically to FIG. 1, the invention generally is comprised of the following parts. A closed vessel 20 is horizontally mounted and has inlets for continuously receiving and discharging material in solution and suspension from oppositely disposed ends respectively and for receiving additional material in solution intermediate the ends. A scroll 22 is mounted stationary in closed vessel 20 and in cooperation with the vessel defines a longitudinally helical path therethrough for the material in solution and suspension. Heating element 24 is mounted at the ends and in and along side of vessel 20 and adapted to be connected to a source of heat for boiling the mass comprised of material in suspension and solution in that portion of the helical path adjacent one side only of scroll 22. A conventional entrainment separator 26 is mounted on top of closed vessel 20 being connected to the interior of the vessel and to an outside source of reduced pressure for removal of solvent vapors. Cradles 28 horizontally support closed vessel 20 and the material and equipment therein. A seed slurry mixer and feeder 30 is mounted adjacent vessel 20 and is connected to an end thereof, that will hereinafter be referred to as the receiving end 32 of the vessel, to provide thereto a continuous seed slurry comprised of material in solution and crystals of material suspended therein. A conventional discharge pump 32 is mounted near the other end of the vessel, that will hereinafter be referred to as the discharge end 36, and connected to vessel 20 to effect the continuous discharge of the treated material against the reduced pressure in closed vessel 20.

In operation and briefly, a reduced pressure is established in vessel 20 and a seed slurry and additional material in solution is continuously drawn therein by the reduced pressure to cover that portion of heating element 24 mounted in vessel 20. Heat is continuously applied to heat element 24 to continuously boil the mass in that portion of the helical path adjacent one side only of scroll 22 thereby evaporating the solvent from solution and precipitating material from solution onto the surface of the crystals suspended therein to greatly enlarge them. The crystallizing mass comprised of crystals and concentrated solution is moved along the helical path defined by scroll 22 and the sides of vessel 20 from the receiving end 32 to the discharge end 36 by the heating and boiling in that portion of the helical path adjacent one side only of scroll 22 in combination with the continuous addition of material in solution. This heating and boiling in that portion of the helical path adjacent one side only of scroll 22 in combination with the continuous addition of material in solution causes the boiling and crystallizing mass to boil up and over the top of scroll 22 on the heated side and to cease boiling as it moves downwards on the non-heated side of scroll 22 to follow the defined helical path to discharge. Additional seed slurry is continuously drawn in receiving end 32 of vessel 20 and additional solution is drawn in intermediate its ends to replace the discharged treated material and the evaporated liquid.

The various parts are described in specific detail below.

Referring to FIG. 1, the closed vessel 20 comprises an open trough 38 and cover 40 the top of which rises well above the trough and reaches an apex at its center to define a vapor space 41 above scroll 22. An entrainment separator 26 is mounted at the apex having a vapor outlet defined therein and provided with mounting 42 for connection to a source of reduced pressure. The trough is closed at the top by cover 40 and comprises an integral curved side and bottom 44 that is joined at the bottom to a vertical side 46. A plurality of inlets are defined in the sides of closed vessel 20 and includes; thermometer inlets 48 (see FIG. 7) in curved side 44; additional solution inlets 50 (see FIGS. 2 and 6) in the curved side and bottom 44; water inlets 52 (FIG. 1) in vertical side 46; and a seed slurry inlet 54 (FIG. 1) adjacent the receiving end 32 of vessel 20. A discharge outlet 56 is also defined in the vertical side 46 adjacent the discharge end 36 of vessel 20 (see FIG. 2). Observation ports 58 are also defined in the vertical side 46 for viewing the interior of the trough 38.

The stationary scroll 22 comprises a tubular center core 62 (see FIGURES 1-8) mounted in the ends of trough 38 extending longitudinally through the trough and a plurality of vertical walls 60 and slanting walls 61 secured to the tubular core. The core 62 comprises a curved-ended side 64 and a pair of straight double sides 65 with insulation 66 mounted between the double sides 65 (see FIGS. 1 and 5) and sealed at both ends. The core is arranged with its curved-ended side and straight sides conforming generally to the curved and vertical sides of the trough respectively and spaced inwardly therefrom (see FIG. 4). As shown in FIGS. 4-7 the cross-sectional area of the tubular core is progressively reduced from a large end sealed in the receiving end of the closed vessel to a small end sealed in the discharge end of the vessel. The vertical walls 60 are transversely mounted on the curved-ended side of the core and parallely spaced longitudinally in progressively increasing distances from the receiving end. The vertical walls 60 extend vertically well up into the vapor space 41 enclosed by the cover 40 and transversely between the curved and vertical sides of the trough surrounding the curved-ended side of the core but leaving a rectangular sectional area open between the vertical wall of the trough and the straight double side of the core (see FIG. 6). The slanting walls 61 are mounted in this area (see FIGS. 1 and 2) and extend longitudinally from the upper part of one vertical wall 60 to the lower part of the next except for the first and last (see FIG. 2), and transversely from the insulated side of core 62 to the vertical side of trough 38. The first slanting wall 61 extends from the receiving end wall and the last extends to the near side of the discharge outlet 56. The vertical and slanting walls in combination thus define a generally helical path around the core from one end of the trough to the other and in combination with the walls of vessel 20 divide the interior of the trough into a plurality of interconnected chambers 67 of progressively increasing size, the smallest of chambers 67 having inlet 54 defined therein and the largest of chamber 67 having discharge outlet 56 defined therein.

The heating element 24 includes the double purpose tubular core 62 heretofore described as a component of the stationary scroll 22, a steam chest 68 mounted on the receiving end of the vessel 20 and an exhaust condensate chest 70 mounted on the discharge end (see FIGS. 2 and 3), steam tubes 72 extending between chest 68 and 70 through the trough between the curved-ended side 64 of the core and curved side 44 of the trough, and steam jacket 74 defined with the curved wall of the trough 38 (see FIGS. 4-7). The core and tubes and jacket have their respective ends sealed in tube sheet 76 in the steam chest 68 and tube sheet 77 in condensate chest 70 respectively. Holes in the transversely mounted vertical walls 60 permit the longitudinal passage of the steam tubes 72. A steam inlet 78 is defined in the steam chest 68 and a condensate outlet 79 is defined in condensate chest 70 for the circulation of steam and condensate through the heating element 24. Since steam jacket 74 is around the curved side of trough 38 and steam tubes 72 are between the heat contributing, curved-ended side 64 of the core and the curved side 44 of the trough, the area therebetween is the boiling side of the vessel 20 and the area between the vertical side 46 of the trough and straight double side 65 of the core is the non-boiling side of vessel 20. A series of longitudinal dams 80 (see FIGS. 2 and 3) extend between vertical walls 60 along and above the tubular core to maintain the level of the boiling mass at the desired height above the heating elements. As it is undesirable for the tube sheets to contribute heat to the mass, insulation 82 mounted in the discharge end wall is provided to insulate tube sheet 77 from the material in process, and insulation 84, mounted between the first vertical wall and the tube sheet 76 is provided to insulate the tube sheet from the material in process. Referring to FIG. 8 an increase of heating surface can be provided with the use of plate type heating elements 90 in place of a number of the steam tubes 72 and makes possible the use of lower pressure steam than required with the tubes.

The seed slurry mixer and feeder 30 (see FIGS. 1 and 9) comprises a dry feeder 92 of standard design for metering seed crystals of material, a mixing chamber 94 connected to receive metered seed crystals, air and material in solution at one end, to discharge air at the other end and to discharge the slurry comprised of seed crystals and material in solution intermediate the ends, the slurry discharge being connected to the receiving inlet 54 of the closed vessel 20. The dry feeder 92 can be of any standard design such as the "Vibra Screw Feeder" manufactured by the Vibra Screw Feeders, Inc. of Clifton, N.J. The mixing chamber 94 comprises a closed vertical tank 96, a sightglass 97, and a second stationary scroll 98 mounted in tank 96. Tubing 100 connects one end of the mixing chamber with a dry feeder discharge funnel 102 which also permits the introduction of air into tubing 100. Tubing 104 from a source of material in solution makes a common entrance with the seed crystals and air in the mixing chamber having therein connected a rotometer 105 for metering the material in solution. Tubing 106 connects mixing chamber 94 to vessel 20, sloping downwards from intermediate the ends of mixing chamber 94 to inlet 54 of vessel 20, and tubing 108 also connects mixing chamber 94 to vessel 20 extending from the upper end of the mixing chamber to inlet 110 above the level of the mass in vessel 20. Valves 112 and 114 are installed respectively in tubes 106 and 108 and when open place the mixing chamber under reduced pressure from closed vessel 20. The reduced pressure draws the metered seed crystals, air the material in solution into the bottom of the mixing chamber up and around stationary scroll 98, the slurry entering closed vessel 20 through inlet 54 and the air entering the closed vessel through inlet 110. Metering valve 116 located in tubing 100 controls the passage of seed crystals and air to the mixing chamber and metering valve 118 controls the passage of material in solution to the mixing chamber. The air entering with the seed crystals assists in transporting the crystals to the mixing chamber and the agitation of the air around scroll 98 assists in the continuous mixing of the slurry. The discharge of the slurry from chamber 94 is controlled by valve 112 located in tubing 106 and at a rate which will maintain the level of the slurry in chamber 94 above inlet 54 at all times as observed through sightglass 97 to allow the air to escape therefrom to be discharged through tubing 108 having valve 114 located therein and connected to inlet 110.

It is common practice to prepare a slurry by mixing fine seed crystals in an organic solvent such as alcohol or gasoline with which to seed the initial graining charge for the discontinuous calandria pan process. This practice can be continued with the invention by continuously introducing the premixed seed slurry to the closed vessel through inlet 54.

The discharge pump 34 is connected to the discharge outlet 56 and may be any conventional rotary discharger or feeder such as the "Beaumont S.T.T. type Rotary Feeder" which is equipped with tap holes for the connection of a reduced pressure source to evacuate the air from the rotor pockets before they enter the loading point and is sold by the Beaumont Birch Co. of Philadelphia, Pa. A crystalscope 120 is mounted intermediate the discharge pump 34 and the last chamber 67 for checking the crystals in the treated material. Any conventional type pan microscope can be used such as the Lasico Crystalscope manufactured by the Los Angeles Scientific Instrument Co. of Los Angeles Calif. The discharge end of the pump 34 is connected to a receiving header (not shown) supplying the centrifuges (not shown). The entrainment separator 26 (FIGS. 1 and 10) comprises several concentric cylinders connected to define vertical paths with sharp turns between the apex of the closed vessel 20 and the vapor outlet provided with mounting 42. The smallest cylinder 122 opens into the interior of the vessel 20 and the largest 124 defining the vapor outlet connects to the vacuum source (not shown). Vapor from the evaporation process in the trough rises to the apex of the closed vessel 20 and follows the sharp path turns between the successive concentric cylinders and is discharged, whereas any entrained liquid is precipitated at the turns and falls back into the trough. The design is well known in the art.

Cradles 28 are steel castings with reinforcing flanges 126 around the perimeters and normal to a web 128. Apertures are defined in the upper part of each cradle to permit the passage of feed-header 132 which is connected to a source of material in solution (not shown) through a control valve 134 and to the plurality of inlets 50 through respective control valves 136. A drain valve 137 connects the low point of the header 132 to a drain. There is an inlet 50 and a control valve 136 to each of the chambers 67. Similarly the water inlets 52 defined in the non-boiling side of the closed vessel give entrance to each of the chambers 67 and are controlled respectively by control valves 138 for flushing the trough after shutdown. Thermometers 140 are installed in inlets 48 of each chamber 67 on the boiling side of the trough to indicate the respective temperatures of the boiling mass.

The method of this invention as applied to the continuous crystallization of sugar or sucrose in the apparatus previously described herein comprises continuously introducing a seed slurry made up of seed crystals and sucrose in solution into inlet 54 causing it to follow the generally helical path around the tubular core 62 while simultaneously supplying it with additional sucrose in solution all along the helical path and carrying out a continuous process of evaporation and crystallization resulting in the growth of the seed crystals until they reach maturity and are discharged from the trough 38 through discharge outlet 56. The means of propelling the crystallizing mass along the helical path is unique in application and requires no moving parts. The method is best understood by considering one chamber 67 as one of a series of process chambers 67 having two compartments defined therein interconnected at their lower ends, the first compartment defined on the non-boiling side of the trough between slanting walls 61 and the second compartment defined on the boiling side of the trough between vertical walls 60. Under the non-boiling conditions, with the mass in process at rest, the level of the mass in each process chamber must be above the level of the tubular core to prevent scorching of sucrose resulting from portions of the mass coming in contact with insufficiently covered heating surfaces. Also under non-boiling conditions the level of the mass is equal on both the non-boiling and boiling side of the trough in each process chamber 67 and is separated from the following process chamber by longitudinal dams 80. Under operational conditions the level of the crystallizing mass remains relatively unchanged while the level of the crystallizing mass on the boiling side of the process chamber is increased by the formation of vapor bubbles within the boiling and crystallizing mass. The height of the dams 80 is such that under operating conditions the dams retain approximately the same volume of mass, excluding vapor bubbles, in each process chamber as contained in the chamber before boiling began. Sucrose solution is supplied to each chamber in a volume greater than the volume of water being evaporated and in combination with the boiling operation causes the mass to overflow dams 80 from the boiling side of the chamber 67 into the non-boiling side of the succeeding chamber 67 resulting in a continuous movement of the crystallizing mass towards the discharge end of the trough. The volume of the process chambers is increased progressively towards the discharge end of the trough in substantially the same proportion as the increase in volume of the crystallizing mass by progressively increasing the spacing between the vertical walls 60 and by progressively reducing the cross-sectional area of the tubular core 62 towards the discharge end of the trough 38.

By the process of evaporation the sucrose solution becomes oversaturated producing an excess of sucrose which is deposited on the surfaces of the seed crystals in suspension thereby tending to reduce the oversaturated or "supersaturated" condition of the sucrose solution. For efficient operation the rate of evaporation is controlled to maintain the supersaturation of the sucrose soution in the upper limits of the metastable zone by balancing the quantity of sucrose produced by evaporation, with the crystal surface available to accept it. As the crystals in process develop in size the available surface area per unit volume of massecuite decreases necessitating a decrase in the rate of evaporation per unit volume of massecuite to maintain the proper balance. This is accomplished by the decrease of the cross-sectional area of the tubular core 62 towards the discharge end of the trough 38 as previously disclosed and thus decreasing the heating surface area and increasing the cross-sectional area of the space confining the massecuite. Prior to operating the invention, certain operational conditions are selected and pre-set and are considered as the independent variables and include the desired pressure vacuum under which the system will operate, the rate of feed of seed slurry to inlet 54 and the corresponding rate of feed syrup fed through valve 134 to header 132. Dependent variables include the steam pressure required to produce the desired amount of evaporation and the proportioning of the sucrose solution to the individual chamber inlets 50. Initially the steam pressure requirements can be calculated and will vary only slightly from the calculations, the slight variation being controlled by observing the size of the crystals in discharge outlet 56 through the crystalscope 120 and adjusting the steam pressure to produce the desired crystal size previously selected. The proportioning of the feed syrup to the individual chamber inlets 50 can also be calculated and will vary only slightly from the calculations and can be pre-set by the use of the metering valves 136 although some adjustment may be necessary to assure the degree of supersaturation within each process chamber is within the proper limits. The limits being the point of saturation of the sucrose solution as minimum and the point of supersaturation where spontaneous nucleation occurs as maximum. The degree of supersaturation is commonly measured in the sugar industry by determining the "boiling point rise" of the sucrose solution which is the difference between the boiling point of water for any given pressure and the boiling point of the sucrose solution at the same pressure, the boiling point of the sucrose solution increasing above that of water with an increasing concentration of sucrose in solution. In the invention the reduced pressure or vacuum within the apparatus remains constant so that a simple measurement of the temperature of the boiling massecuite in each chamber 67 will be an indication of the degree of saturation of the boiling sucrose solution in the respective chambers. It should be necessary to make the slight adjustment to inlet valves 136 only once in the early stages of the continuous process as the apparatus and process will tend to be self-correcting. With the rate of feed syrup pre-selected and the steam pressure properly controlled the overall supersaturation of the material in process will be correct and should the degree of supersaturation in one of the chambers 67 be in the lower part of the desired range this will be compensated for by one or more of the other chambers being of a degree of supersaturation in the upper part of the range.

To start operation the closed vessel is first placed under reduced pressure. An initial charge of sucrose solution is then fed into the trough 38 to bring the level of the liquid above the heat elements. The steam is applied to the heat element 24 to carry out the evaporative process and sucrose solution is added through feed header 132 and inlets 50 to maintain the proper processing level until the approximate desired degree of supersaturation is obtained in the first process chamber 67 at which time the introduction of seed slurry into inlet 54 is begun. Until the initial seed crystals have reached the discharge chute 56 the first portion of the material discharged from the crystallizer will have to be remelted and returned to process. After this the product discharged is sent to the centrifugals (not shown) the process being monitored by means of the thermometers 140, crystalscope 120 and observation ports 58 and controlled by feed valves 136, 116, 118, 112 and 114. To shutdown, the heating surfaces or heater 24 within trough 38 must be kept covered until their temperature has been reduced to that of the massecuite to prevent the possibility of scorching. The feeding of the seed slurry is discontinued by closing valves 112 and 114. The sucrose solution feed inlet valves 136 are closed progressing from the first of chambers 67 onwards to the discharge chamber. After passage of the last of the seed crystals from each chamber 67 the massecuite is replaced with water through the water inlet valves 138. When following this shutdown procedure the product being discharged should be continually inspected through the crystalscope 120 and once irregularities appear in the crystal formation the material remaining in the trough 38 should be discharged into a melter (not shown) for reprocessing. Once all the sucrose solution in the crystallizer has been replaced with water the heater 24 may be shutdown and the water in the trough discharged through valves 136 connected to each process chamber 67 in header 132 and drain valve 137.

An alternate or second species of the invention is shown in FIGS. 11 and 12 comprising in general a plurality of adjoining individual chambers 142 in horizontal succession and of progressively increasing capacity, each of chambers 142 having a first and second compartment defined therein, heating elements 144 mounted in each of the second compartments and inlets defined in each chamber. The individual chambers are defined by open trough 146 and the plurality of vertical walls 148. Vertical walls 148 are transversely mounted and parallely spaced longitudinally in progressively increasing distances apart from one end to the other of trough 146 being mounted on the bottom and sides of the trough 146 but do not extend the full height providing interconnections between the chambers at their upper ends. Vertical partitions 150 are mounted parallel to and intermediate walls 148 being secured to the walls of trough 146 and spaced vertically from the bottom and extending to the top of trough 146 thereby dividing the chambers into a first and a second compartment interconnected at their bottoms. The walls 148 and partitions 150 define a wavelike path through the trough 146 passing over walls 148 and under partitions 150. Each of the second compartments are provided with heating elements 144 extending transversely between the sides of trough 146. A feed header 152 is connected to each chamber through inlets 154 to continuously supply material in solution to each chamber 142 and inlet 156 is defined in the first compartment of the first chamber for introducing a seed slurry. In operation the trough 146 is filled to the level indicated in FIG. 11. When heat is applied to the heating elements 144 the solution in each of the second compartments commence boiling and in combination with a continuous additional supply of material in solution through header 152 and each inlet 154 the boiling solution overflows walls 148 into the first compartment of the succeeding chamber to cease boiling and flow downwards under partition 150 into the succeeding second compartment thereby progressing from compartment to succeeding compartment and from chamber to succeeding chamber as shown in FIGURE 12 towards the discharge end. A seed slurry is continuously introduced through inlet 156 into the first compartment of the first chamber 142 to flow downwards under the first partition 150 and join the boiling solution as the nuclei for the crystallizing material to be deposited upon.

FIG. 13 is a third species of the invention differing from the apparatus of FIGURES 11 and 12 only in the receiving end of the trough wherein the first chamber is comprised of a single compartment only with heating elements 144 mounted therein and seed slurry inlet 156 connected to inlet 154 of the single chamber. FIGURES 11, 12 and 13 can also be considered as a series of conterminous chambers alternately connected at their upper ends and at their lower ends, each alternate conterminous chamber being provided with heating elements and solution inlets.

The invention may be used in cooperation with other crystallizing apparatus. Thus in one phase of the normal steps of the manufacturing process of raw cane sugar, a seed massecuite is prepared in conventional vacuum pans to be used as footings in the following boilings wherein the size and weight of the crystals is increased 20 to 27 times that of the seed boilings. The single-stage embodiment of the invention described and shown in drawings 1 through 7 using 20 to 25 individual process chambers would be particularly appropriate for carrying out this second boiling on a continual basis without the need for the apparatus and method described herein for mixing and introducing the seed slurry. The modification schematically shown in FIGURE 10 may be particularly appropriate in respect of the treatment of those materials wherein the overall increase in volume of material in process makes it impractical to proportionately increase the volume of the individual process chambers in a single-stage unit. It then becomes advantageous to utilize a pair of vessels employing the invention in cascade arrangement, its parts therein differing only in size commensurate to the increased mass of material processed and corresponding generally in construction and functioning to parts in the embodiment of FIGURES 1 through 7.

For the most efficient operation of the invention it is desirable for the velocity of crystal growth to approach the maximum rate possible within each chamber and still be maintained within the metastable zone. For sucrose solutions this maximum velocity is a variable and dependent upon the characteristics and temperature of the sucrose solution. When the solution is in a state of boiling the temperature is dependent upon the boiling pressure and the concentration and purity of the solution. Although this would make it appear that every application in the field of sugar crystallization would require a particular design this is not necessarily so. An embodiment of the invention designed and constructed for use in the crystallization of granulated sugar can be used for the crystallization of other grades of sugar by modifying only the height of the dams, all other changes being in operational variables which may include the degree of vacuum, steam pressure, quantity of feed supplied to each chamber and seed crystal size.

To develop the design of an embodiment of the invention for use in the crystallization of sugar all necessary data, except for determining the height of the dams, can be obtained or developed from tables appearing in the standard sugar handbooks. Two main objectives are considered in the design of such a unit. The first objective is to maintain the proper ratio between heating surface area and massecuite volume such that with the proper steam pressure the rate of crystal growth is maintained near maximum, commensurate with the upper limits of the metastable zone, in all chambers. To realize this objective it is necessary to have a good approximation of the area of crystal surface available at every point along the length of the trough and the rate that this surface area can accept crystallized sugar under operating conditions and still remain in the metastable zone, it is also necessary to have a good approximation of the amount of evaporation required and the quantity to be expected from each square foot of heating surface under operating conditions and must consider the quantity of water in the feed syrup, boiling temperature, steam pressure, percent dissolved solids in the syrup surrounding the crystals and the overall heat transfer rate. The second main objective is to increase the volume of each chamber in general in proportion to the increase in growth of the volume of massecuite. This requires determining for each chamber the rate of evaporation, the quantity of feed syrup and the change in density of the massecuite. Using data found in the sugar handbooks a considerable portion of the calculations can be made using standard rate equations but a portion has to be calculated on a trial and error basis.

The purposes of the dams is both to maintain the level of the massecuite above the heating surfaces to prevent scorching and to maintain approximately the same volume of massecuite, excluding vapor bubbles, in each chamber as contained in the chamber before boiling began as previously disclosed. This volume of massecuite in each chamber is such that the correct quantity of crystallized sugar is maintained in each chamber to produce the most desirable rate of crystal growth. The proper height of the dams can be estimated as one third the height above the designed non-boiling level of the massecuite and after installation and initial operation of the unit, modifications can be made to the heights of the dams to achieve the most desirable results.

For the purpose of exemplification the following general operating and construction data is given for a particular two-stage embodiment of the invention which is capable of producing approximately 1000 pounds of granulated sugar per minute in a massecuite containing 50–55 percent crystallized sugar and beginning with .10 cubic foot per minute of feed slurry containing 1.84 pounds of powdered sugar and using a feed syrup containing 70% sucrose. Both stages are operated under 25 inches of vacuum gauge and requires steam pressure in the range of 60 to 70 pounds per square inch. The rate of evaporation is such that the rate of crystal growth will be maintained in the range between 3000 and 4000 milligrams of sucrose per minute per square meter of crystal surface. The first stage has a total heating surface of 95 square feet and a massecuite working volume of 22–25 cubic feet with a non-boiling depth of 2 feet. The ratio of square feet of heating surface to cubic feet of massecuite is 6.00 at the feed end decreasing to 3.40 at the discharge end of the first stage. The trough of the first stage is 20 feet long and contains 20 processing chambers, each chamber increases in volume by 1.18 times the volume of the preceding chamber. The height of the dams is pre-set at 12 inches. This initial height should be modified for each dam to achieve maximum efficiency in each chamber but it should never be reduced below the level necessary to maintain the non-boiling level of the massecuite above the heating elements. The second stage has 877 square feet of heating surface and a massecuite working volume of 315–320 cubic feet with a non-boiling depth of 6 feet. The ratio of square feet of heating surface to cubic feet of massecuite is 3.25 at the feed end and decreases to 2.40 at the discharge end. The trough is 20 feet long and contains 20 processing chambers, each chamber increases in volume by 1.11 times the volume of the preceding chamber. The height of the dams are pre-set at 18 inches and should be adjusted individually in the interest of maximum efficiency in each chamber as in the first stage.

Although the invention has been described with a certain degree of particularity, it is understood that numerous changes in the details of construction and the combination and arrangement of parts may be resorted to without departing from the spirit and scope of the invention hereinafter claimed.

What is claimed is:

1. An improved apparatus for continuously crystallizing material from solution by evaporation comprising; a plurality of adjoining individual chambers in horizontal succession and of progressively increasing volume; a cover for enclosing said plurality of chambers; means for dividing each chamber into a first and second compartment interconnected at their lower ends and said second compartments interconnected to the first compartment of the succeeding chamber at their upper ends, said interconnections for passage of the crystallizing mass from compartment to succeeding compartment and from chamber to succeeding chamber; means for connecting said chambers to a source of reduced pressure; heating means mounted in each of said second compartments for boiling said crystallizing mass; means for continuously preparing and introducing a controlled amount of a slurry composed of seed crystals and material in solution into the first compartment of the first chamber; feed means for continuously supplying a controlled amount of feed solution to each of said chambers; and means to continuously discharge treated material from last of said chambers.

2. The improved apparatus of claim 1 wherein said means for continuously preparing and introducing a controlled amount of said slurry comprises; a mixing chamber for mixing the seed crystals and material in solution; means for feeding continuously a controlled amount of seed crystals and entrained air to said mixing chamber; means for feeding continuously a controlled amount of material in solution to said mixing chamber; means for discharging a controlled amount of said slurry from said mixing chamber into said first compartment of said first chamber above the level of the mass in said first compartment.

3. The apparatus of claim 2 wherein said mixing chamber comprises; an enclosed vertical tank; inlet means at the bottom of said tank for receiving jointly said seed crystals, entrained air and material in solution; a sight-glass for determining the level of the surface of said slurry in said tank; outlet means level with said sight-glass sloping downwards from said mixing chamber for discharging a controlled amount of said slurry devoid of entrained air; outlet means above the level of said sight-glass for discharging entrained air, said outlet means level with said sight-glass and said outlet means above the level of said sight-glass being connected to a source of reduced pressure; and a stationary vertical scroll to aid in the mixing of said feed crystals and said material in solution, said scroll extending from the bottom of said tank to terminate below said sight-glass and abutting the walls of said tank.

4. An improved apparatus for continually concentrating material from a continual supply of material in solution and comprising; a plurality of progressively increasing in volume vertical conterminous chambers in horizontal sucession that interconnect alternately at their upper and lower ends; means for continually and separately supplying feed solution to each said chamber with said material in solution to cover said lower but not said upper interconnections; and heating means for boiling said material in solution mounted in the alternate chambers that respectively interconnect at their upper ends with the next succeeding chambers, whereby said material in solution is successively concentrated by evaporation in each of the boiling chambers and is boiled over through said upper interconnections into the following respective non-boiling chambers to cool and pass through said respective lower end interconnections and thereby thermally progress successively through said plurality of chambers to discharge therefrom.

5. The improved apparatus as described in claim 4 wherein each of said conterminous chambers comprises; an open trough defining an interior space; first transverse walls progressively spaced apart longitudinally and mounted on the bottom of said trough and extending across said interior space; second transverse walls progressively spaced apart longitudinally, intermediate said first vertical walls and extending above them and spaced vertically above said bottom of said trough, said walls being secured to the sides of said trough to extend across said interior space, thereby defining a wavelike path of increasing wave length over said first vertical walls and under said second vertical walls.

6. The improved apparatus as described in claim 4 wherein said conterminous chambers comprise; an open trough defining an interior space; first transverse walls progressively spaced apart longitudinally and mounted on the bottom of said trough and extending across said interior space; second transverse walls progressively spaced apart longitudinally intermediate said first vertical walls and extending above them and spaced vertically above the bottom of said trough, said walls being secured to the sides of the trough to extend across the interior space, thereby, defining a wavelike path of increasing wave length over said first vertical walls and under said second walls.

7. An improved apparatus as described in claim 6 wherein said core comprises a tube adapted to act as a heating means; and insulation secured to a half of the perimeter defined by a vertical axis for the length of said tube, whereby said core acts as an eccentric heat exchanger for the conterminous chambers on one side of said core.

8. An improved apparatus as described in claim 6 wherein said helical element comprises; a plurality of vertical walls mounted transversely on said core and longitudinally spaced apart a progressively increasing distance, said walls extending vertically from the bottom of said trough to above said core and said other side of said trough thereby defining a space between said core and said other side of said trough; slant walls extending from the top of said core at each of the vertical walls to the bottom of said core at each of the next in line vertical walls, thereby defining a variable pitch helical element.

9. An improved method for continuously crystallizing material from solution by evaporation comprising; directing a continuous stream of crystalizing mass comprised of developing crystals and material in solution through a plurality of chambers of progressively increasing volume, each of said chambers having a non-boiling and boiling compartment defined therein; continuously mixing and feeding a controlled amount of a slurry comprised of seed crystals in a liquid carrier into the non-boiling compartment of the first of said chambers and simultaneously feeding a continuous controlled amount of material in solution into the first of said chambers, said slurry flowing downwards joining said material in solution and entering the boiling compartment of said first chamber to commence boiling whereby the mass comprised of said slurry and material in solution is concentrated and crystallized by evaporation; causing said boiling and crystallizing mass to overflow said boiling compartment of said first chamber into the non-boiling compartment of the second chamber causing said crystallizing mass to cease boiling and flow downwards into the boiling compartment of said second chamber to repeat the evaporative process and pass therefrom through the succeeding chambers continuously crystallizing in each of said chambers and being supplied a controlled additional amount of material in solution in each of said chambers and discharging the developed crystals and concentrated solution from the last chamber.

10. An improved method of continually concentrating material by evaporation from a continuing supply of material in solution comprising; simultaneously boiling and evaporating said solution in the single boiling compartment of each of a series of horizontally aligned adjoining chambers of progressively increasing volume to boil over into the respective single non-boiling compartment of the next chamber; stopping said solution from boiling in said next adjoining chambers and flowing it into the bottom of the respective following boiling chamber; continually and separately feeding solution to each of said boiling chambers in amounts equal to the loss by evaporation and the amount of material crystallized from solution; and discharging the boil over concentrate from the last boiling chamber.

11. An improved apparatus for continuously crystallizing material from solution by evaporation comprising; a horizontal elongated hollow body comprising a plurality of transverse chambers arranged in horizontal succession, said chambers being of progressively increasing volume for accommodating an increasing volume of mixture comprised of solution and crystallized material; means for dividing each of said chambers into a first and a second compartment having a flow promoting connection at their lower ends and each said second compartment having an over-flow promoting connection to the adjacent first compartment of the succeeding chamber at their respective upper ends, said connections permitting passage of said mixture from compartment to succeeding compartment and from chamber to succeeding chamber in helicoidal manner; feed means for continuously supplying a controlled amount of solution to each of said chambers to replace evaporative loss and to replace said material crystallized from solution in said mixture and to augment the volume of solution in said mixture; heating means eccentrically mounted to heat only said second compartments for boiling said solution, said boiling for crystallizing said solution by evaporation and said boiling for moving said mixture through said apparatus; and means for discharging said mixture from said apparatus.

12. An improved apparatus for continuously crystallizing material from solution by evaporation comprising; a plurality of horizontally adjoining individual, transverse vertically disposed chambers arranged horizontally in longitudinal axial succession, said chambers being of progressively increasing volume for containing an increasing volume of mixture of solution and crystallized material; the first of said chambers being of a single compartment and with means for dividing each succeeding chamber into a first and second compartment interconnected at their lower ends and each second compartment interconnected to the first compartment of the succeeding chamber at their upper ends and said single chamber interconnected to the first compartment of the succeeding chamber at their upper ends, said interconnections for passage of said mixture from compartment to succeeding compartment and from chamber to succeeding chamber;

feed means for continuously supplying a controlled amount of solution to each of said chambers to replace evaporative loss and to replace said material crystallized from solution in said mixture and to augment the volume of solution in said mixture; heating means mounted in said first chamber and in each of said second compartments for boiling said solution, said boiling for crystallizing said solution by evaporation and said boiling for moving said mixture through said apparatus; and means to continuously discharge said mitxure from said apparatus from last of said chambers.

13. An improved apparatus for continuously crystallizing by evaporation material from solution onto seed crystals and comprising; a plurality of horizontally adjoining individual transverse vertically disposed chambers arranged in horizontal axial succession, said chambers being of progressively greater volume for accommodating an increasing volume of mixture comprised of solution and crystallized material; means for dividing each of said chambers into a first and a second compartment interconnected at their lower ends and said second compartments respectively interconnected to said first compartments of the next succeeding chambers at their respective upper ends, said interconnections for passage of said mixture from compartment to succeeding compartment and from chamber to succeeding chamber; a cover for enclosing said plurality of chambers; means for connecting said chambers to a source of reduced pressure to reduce the boiling point of said solution; inlet means in the first of said chambers for continuously introducing a slurry comprised of seed crystals in a liquid carrier, feed means for continuously introducing a controlled amount of solution to each of said chambers to replace evaporative loss and to replace said material crystallized from solution in said mixture and to augment the volume of solution in said mixture; heating means eccentrically mounted in each of said second compartments for boiling said solution, said boiling for crystallizing said solution by evaporation and said boiling for moving said mixture through said apparatus; means for progressively reducing the ratio of heating surface to said chamber volume to maintain said crystallization by evaporation at a rate at which said growing seed crystals accepts all said crystallized material; and means to continuously discharge the mixture of enlarged crystals and solution from said apparatus from last of said chambers.

14. An improved method for continuously crystallizing material from solution by evaporation onto seed crystals comprising; directing a mixture of seed crystals and material in solution successively through a plurality of progressively larger conterminous chambers each having first and second compartments, forming said mixture by feeding a controlled amount of seed crystals in a liquid carrier and a controlled amount of material in solution into the first of said chambers; successively augmenting said mixture volume by feeding a controlled, separate amount of said solution only to each of succeeding of said chambers; boiling said mixture in each of said second compartments thereby crystallizing said material from solution by evaporation onto said seed crystals and thereby causing said mixture to overflow said second compartments into said first compartments of the succeeding of said chambers to flow downwards into said second compartments and up into the succeeding first compartments to repeat the boiling process; maintaining said crystallization of material from solution at a rate at which said growing seed crystals can accept said crystallized material by reducing the ratio of heat to volume of said mixture in each succeeding of said chambers; passing said mixture through the successive chambers with said material being crystallized from solution onto said seed crystals without forming new crystals and discharging the mixture of greatly enlarged crystals and augmented solution from the last of said chambers.

15. The method of claim 14 wherein the continuous mixing and feeding of a controlled amount of seed slurry comprises; bringing together to form said slurry a stream comprised of a controlled amount of seed crystals and air and a second stream comprised of a controlled amount of solution to be crystallized; drawing said slurry into a vertical mixing vessel, said mixing vessel being connected at its top to a source of reduced pressure, said mixing vessel having an absolute pressure greater than said plurality of chambers; mixing said slurry within said vessel by the agitation of the air as said air moves upwards towards the source of reduced pressure to be discharged therefrom; and discharging said slurry into the first of said plurality of chambers in a downwards direction at a controlled rate to maintain the outlet from said mixing vessel completely covered by said slurry within the chamber to prevent the inclusion of entrained air.

16. The improved apparatus as described in claim 13 wherein said plurality of adjoining individual chambers comprises; a trough having a bottom, opposite sides and respectively opposite feed and discharge ends defining a longitudinal interior space; a stationary scroll mounted longitudinally in said interior space and comprising said means for progressively reducing the ratio of said heating means heat output to said chamber volume including a core extending through and dividing said interior space longitudinally, and a plurality of interconnected transverse partitions mounted on said core and extending in a series of encirclements from adjacent said feed end of said trough to adjacent said discharge end of said trough and to abut said trough sides and bottom thereby defining generally a helical path radially around said core to divide said interior space into a horizontal succession of vertical chambers interconnected at their upper ends and said core dividing said chambers into first and second compartments respectively and interconnected at their lower ends.

17. The improved apparatus as described in claim 16 wherein said core comprises; a tube adapted to act as a supplemental heating means, said tube being of progressively reduced cross-sectional area to contribute to the increase of cross-sectional capacity of said chambers and thereby progressively reduce the ratio of said heating means to said chamber volume; and insulation secured the length of said tube to that portion of the perimeter of said tube adjacent said first compartments of said plurality of chambers for making said supplementary heating means eccentric.

18. The improved apparatus as described in claim 16 wherein said partitions comprises; a plurality of vertical walls mounted transversely on said core and spaced progressively further apart on said core; said walls extending vertically from the bottom of said trough to above said core and transversely between the opposite trough sides extending above and below said core and from side of said trough adjacent said second compartment to said core thereby defining a space between said core and side of said trough adjacent said first compartments of said plurality of adjoining chambers; slanted walls respectively engaging said vertical walls at top of said core and extending to the bottom of said core to engage the next succeeding vertical wall and extending transversely from side of said core adjacent said first compartments to side of said trough adjacent said first compartments, said vertical and slant walls in combination defining a generally helical path of progressively increasing pitch from adjacent said feed end of said trough to said discharge end of said trough.

19. The apparatus as described in claim 16 characterized in that vertical dams are mounted longitudinally along the top of said core extending between said partitions, said dams for increasing the amount of said mixture in each of said chambers and to provide means for maintaining the mixture above said heating means to thereby prevent scorching said material in solution.

20. The apparatus of claim 16 characterized in that the side of the trough adjacent said first compartments is generally straight and the opposite side and bottom of of said trough adjacent said second compartments are arcuate.

21. The apparatus of claim 16 characterized in that some of said eccentric heating means comprises a plurality of steam tubes mounted longitudinally between said opposite ends of said trough and extending through said second compartments to terminate in steam chests at said ends respectively.

References Cited

UNITED STATES PATENTS 881,523  10/1904  Winter _____ 159—27 X
3,326,280  6/1967  Bosquain et al. _____ 165—161

FOREIGN PATENTS 38,600  2/1909  Austria.
276,664  7/1914  Germany.
555,139  6/1923  France.
313,983  6/1929  Great Britain.
553,815  6/1932  Germany.
1,324,801  3/1963  France.

NORMAN YUDKOFF, *Primary Examiner.*

J. SOFER, *Assistant Examiner.*

U.S. Cl. X.R.

23—273; 127—16; 159—45, 47; 165—161